United States Patent
Setos

(10) Patent No.: US 12,184,912 B2
(45) Date of Patent: Dec. 31, 2024

(54) SYSTEM FOR TEMPORARY ACCESS TO SUBSCRIBER CONTENT OVER NON-PROPRIETARY NETWORKS

(71) Applicant: SETOS FAMILY TRUST, Pacific Palisades, CA (US)

(72) Inventor: Andrew Setos, Pacific Palisades, CA (US)

(73) Assignee: SETOS FAMILY TRUST, Pacific Palisades, CA (US)

( * ) Notice: Subject to any disclaimer, the term of this patent is extended or adjusted under 35 U.S.C. 154(b) by 0 days.

(21) Appl. No.: 16/233,389

(22) Filed: Dec. 27, 2018

(65) Prior Publication Data

US 2019/0132622 A1    May 2, 2019

Related U.S. Application Data

(60) Provisional application No. 62/715,433, filed on Aug. 7, 2018.

(51) Int. Cl.
*H04N 7/173* (2011.01)
*G06F 21/10* (2013.01)
(Continued)

(52) U.S. Cl.
CPC ......... *H04N 21/2396* (2013.01); *G06F 21/10* (2013.01); *G06F 21/31* (2013.01);
(Continued)

(58) Field of Classification Search
CPC ........... H04N 21/4532; H04N 21/4623; H04N 21/84; H04N 21/4542; H04N 21/4755; H04N 21/454; H04N 21/4751; H04N 21/4753; H04N 21/44222; H04N 21/812; H04N 7/163; H04N 7/162; H04N 7/165;
(Continued)

(56) References Cited

U.S. PATENT DOCUMENTS

| | | | |
|---|---|---|---|
| 7,571,458 B1 * | 8/2009 | Eyal ................... | H04M 3/53 348/468 |
| 8,006,270 B2 | 8/2011 | Martini et al. | |

(Continued)

OTHER PUBLICATIONS

International Search Report dated Mar. 22, 2019 from corresponding International Patent Application No. PCT/US2018/067612, 3 pages.

(Continued)

*Primary Examiner* — Annan Q Shang
(74) *Attorney, Agent, or Firm* — Ruggiero McAllister & McMahon LLC

(57) ABSTRACT

A system is provided for allowing temporary access to subscriber content through a network appliance. The system includes a server application residing on a platform server, an appliance application residing on the network appliance, and a mobile application residing on a mobile device. The server application determines the location of each of the network appliance and the mobile device. If they are within a set distance of one another, the server application allows for the temporary access to, and display of a subscriber's content on the network appliance. The server appliance can transmit a code to the network appliance, which the user then inputs into the mobile device.

22 Claims, 2 Drawing Sheets

(51) Int. Cl.
- *G06F 21/31* (2013.01)
- *H04L 9/40* (2022.01)
- *H04N 21/239* (2011.01)
- *H04N 21/258* (2011.01)
- *H04N 21/41* (2011.01)
- *H04N 21/442* (2011.01)

(52) U.S. Cl.
CPC .......... *H04L 63/102* (2013.01); *H04L 63/107* (2013.01); *H04N 21/25841* (2013.01); *H04N 21/41265* (2020.08); *H04N 21/44218* (2013.01); *G06F 2221/2111* (2013.01); *G06F 2221/2139* (2013.01); *H04N 21/25816* (2013.01); *H04N 21/25875* (2013.01)

(58) Field of Classification Search
CPC .......... H04N 21/2396; H04N 21/4126; H04N 21/44218; H04N 21/25841; H04N 21/25816; H04N 21/25875; H04N 21/41265; G06F 21/10; G06F 21/31; G06F 2221/2111; G06F 2221/2139; H04L 63/107; H04L 63/102
See application file for complete search history.

(56) References Cited

U.S. PATENT DOCUMENTS

| | | | |
|---|---|---|---|
| 8,412,798 B1 | 4/2013 | Wang | |
| 8,484,687 B2 | 7/2013 | Dasher et al. | |
| 8,528,014 B2 | 9/2013 | Reynolds et al. | |
| 8,621,504 B2 | 12/2013 | Reynolds et al. | |
| 8,938,497 B1 | 1/2015 | Wang | |
| 9,137,575 B2 | 9/2015 | Schlack | |
| 9,247,001 B2 | 1/2016 | Wang | |
| 9,350,799 B2 | 5/2016 | Wang | |
| 9,525,736 B2 | 12/2016 | Wang | |
| 9,641,880 B1* | 5/2017 | Scurtu | G06F 21/10 |
| 9,736,541 B1 | 8/2017 | Nijim et al. | |
| 9,854,033 B2 | 12/2017 | Wang | |
| 9,860,576 B2 | 1/2018 | Reynolds et al. | |
| 10,187,745 B1* | 1/2019 | Zhao | H04L 43/10 |
| 10,742,659 B1* | 8/2020 | Roka | H04L 63/102 |
| 11,727,437 B2* | 8/2023 | Heeter | G06Q 30/018 235/487 |
| 2004/0117853 A1* | 6/2004 | Karaoguz | H04L 29/06027 725/134 |
| 2007/0118396 A1* | 5/2007 | Matz | G06Q 30/0207 705/1.1 |
| 2008/0168515 A1* | 7/2008 | Benson | G06F 21/10 725/110 |
| 2008/0178271 A1* | 7/2008 | Gajjala | H04L 63/08 726/6 |
| 2009/0293083 A1* | 11/2009 | Gordon | H04N 7/162 725/25 |
| 2010/0161635 A1* | 6/2010 | Dey | H04N 21/4788 707/758 |
| 2010/0180029 A1* | 7/2010 | Fourman | G06F 16/9535 709/225 |
| 2010/0242079 A1* | 9/2010 | Riedl | H04N 7/17318 725/115 |
| 2011/0069940 A1* | 3/2011 | Shimy | H04N 5/44543 386/296 |
| 2011/0138064 A1* | 6/2011 | Rieger | H04N 21/433 707/715 |
| 2011/0209196 A1* | 8/2011 | Kennedy | G06F 21/60 726/1 |
| 2011/0289537 A1 | 11/2011 | Buehl | |
| 2012/0042343 A1* | 2/2012 | Laligand | H04N 21/234336 725/53 |
| 2012/0266200 A1 | 10/2012 | Dasher et al. | |
| 2013/0212615 A1* | 8/2013 | Schultz | H04N 21/441 725/25 |
| 2014/0340330 A1* | 11/2014 | Trachtenberg | H04N 21/485 345/173 |
| 2014/0351834 A1* | 11/2014 | Srivastav | H04N 21/4227 725/31 |
| 2015/0070516 A1* | 3/2015 | Shoemake | H04N 21/4542 348/207.11 |
| 2015/0230004 A1 | 8/2015 | VanDuyn et al. | |
| 2015/0271541 A1* | 9/2015 | Gonder | H04L 65/605 725/134 |
| 2015/0365787 A1 | 12/2015 | Farrell | |
| 2016/0044385 A1 | 2/2016 | Kareeson et al. | |
| 2016/0094883 A1* | 3/2016 | Tidwell | H04N 21/4524 725/109 |
| 2016/0182971 A1* | 6/2016 | Ortiz | G06F 3/0484 725/34 |
| 2016/0219024 A1* | 7/2016 | Verzun | H04L 63/102 |
| 2016/0269791 A1* | 9/2016 | Laczynski | G06Q 30/00 |
| 2017/0269804 A1* | 9/2017 | Richman | H04N 21/466 |
| 2017/0272824 A1* | 9/2017 | Bunner | H04W 76/14 |
| 2017/0359722 A1* | 12/2017 | Folse | H04L 63/083 |
| 2018/0035074 A1* | 2/2018 | Barnes, Jr. | H04N 1/00204 |
| 2018/0063564 A1* | 3/2018 | Phatak | H04N 21/472 |
| 2018/0069898 A1* | 3/2018 | Pacifici | H04L 63/20 |
| 2018/0173906 A1* | 6/2018 | Rodriguez | H04L 9/3213 |
| 2018/0176017 A1* | 6/2018 | Rodriguez | H04L 63/20 |
| 2019/0188756 A1* | 6/2019 | Bradley | G06V 40/16 |
| 2020/0014965 A1* | 1/2020 | Bray, Jr. | H04N 21/41407 |

OTHER PUBLICATIONS

Written Opinion dated Mar. 22, 2019 from corresponding International Patent Application No. PCT/US2018/067612, 12 pages.

Australian First Examination Report dated Nov. 1, 2021 from corresponding Australian Patent Application No. 2018436153, 4 pages.

European Supplementary Search Report dated Apr. 20, 2022 from corresponding European Patent Application No. 18929202.2, 6 pages.

\* cited by examiner

SYSTEM FOR TEMPORARY ACCESS TO SUBSCRIBER CONTENT OVER NON-PROPRIETARY NETWORKS

CROSS-REFERENCE TO RELATED APPLICATION

The present application claims the benefit of U.S. Provisional Patent Application Ser. No. 62/715,433, filed on Aug. 7, 2018, which is herein incorporated by reference.

BACKGROUND OF THE DISCLOSURE

1. Field of the Disclosure

The present disclosure provides a system for allowing temporary access to or delivering subscriber content to a user through public or non-proprietary networks. The content can be audio-visual in nature, such as movies, linear channels, or episodes of television shows. In particular, the system of the present disclosure provides algorithms and network components to determine the co-location of a portable user communication appliance (e.g., a smartphone) and an appliance (e.g., AppleTV®) that is enabled for a non-proprietary network (e.g. the public Internet) for the purpose of authorizing said appliance to display content, especially temporarily.

2. Description of the Related Art

For the over twenty years since Tivo® Inc. began to sell its branded digital video recorder (DVR), the notion of "TV Anytime" has grown to become a mainstream feature of most multichannel video programing distributors (MVPD's) and Linear Channels (e.g. HBO®, CBS®). "TV Anytime" implies that a consumer, subscriber or viewer does not need to watch the program, show or sporting event when it is initially distributed, but at any time they choose. MVPD's and Linear Channels, by employing proprietary DVR's and smartphone "apps", respectively offer TV Anytime to their subscribers. Several years later, a similar but orthogonal notion was proposed by TV platform proprietors called "TV Anywhere" a.k.a. "TV Anyplace". The central theme of this feature is that if a person legitimately subscribed to a Linear channel (e.g. HBO®, Fox®, ESPN®), then that person should be able to view those linear channels anywhere they find themselves. The definition of "anywhere" was stretched by some to include the entire planet Earth, much to the chagrin of sports leagues, television and movie distributors, and other content rights holders, since they license their products in each territory separately.

When using mobile devices, the limitations suffered by the subscriber are three-fold. The content would be viewed on a small screen and for some this would not be as satisfying as on a full sized TV display. Beyond the size of the image being potentially dissatisfying, the content cannot be easily viewed simultaneously with friends or family. Further, access to the public internet would be by 4G wireless or Wi-Fi. In the former case, the cost to stream for a long period of time has proven to be prohibitive. Even so-called "unlimited" plans reduce performance at some point, rendering the streaming of audio-visual content impractical. In the latter case, Wi-fi is a notoriously unpredictable resource for streaming audio-visual content, especially when using a system not under the subscriber's direct control.

As previously discussed, one way that users utilize, consume, or watch content that they own, rent or have a subscription service to is via a network-communication-enabled appliance, for example an AppleTV®. Currently, any such device can be authorized to any subscriber's account by entering the subscriber's username and password. However, this can be cumbersome given the lack of keyboard entry. Also, if being used by a non-resident the entry of username and password is in plain sight of anyone in the room, presumably not in the non-resident's family. Therefore such entry, cumbersome as it is, also exposes the temporary subscriber's credentials to anyone within view of the display screen or TV set. Asking everyone to "leave the room while I authorize this appliance for my subscriptions" is clearly not conducive to ease of use. Further inconvenience is encountered when the subscriber in whose residence the appliance is located must re-enter their own credentials.

The present disclosure obviates those traditional steps, rendering the process more convenient and secure for both the resident, the visitor and the platform or copyright proprietors.

SUMMARY OF THE DISCLOSURE

The system of the present disclosure includes an application, a.k.a. "app", on the subscriber's portable user communication device with access to the device's location services, an application on the network-enabled appliance, and an application that runs on a platform server. In the manner described below, the server application compares the location of the appliance and the portable user device, and if they are within a set distance of one another, allows the user to display content that they legitimately subscribe to on the appliance.

For ease of description, the term "smartphone" is used throughout the rest of the disclosure to refer to the portable user communication device. Other devices can be used in the system of the present disclosure, such as a laptop computer or tablet. Further, the term "Internet" is used to refer to a communications network that is publicly accessible, with or without a password or security key. This is to be distinguished from a network, such as that used by a cable provider, that is not publicly accessible. Similarly, an "Internet appliance" is used to describe an appliance connected to a viewing display, aka a TV set, or could be integrated with a TV set, aka a SMART TV, that has access to the public network. The "content" to which temporary access is granted can be that which is owned or rented by the subscriber and stored remotely, or for which the subscriber has a subscription or license that enables streaming.

The present disclosure includes at least three components that obviate the limitations mentioned above with currently available or previous systems. The first is an authentication system which is simple and easy to use for the subscriber yet secure from a copyright owner's perspective. The present disclosure also allows for viewing via a "main display" in a residence or business. In the past this would be stated as the "living room TV". The present disclosure also provides access to the public Internet using high bandwidth links, such as those provisioned by DOCSIS modems, which rarely if ever include data caps, so costs for the subscriber are fixed regardless of use and enjoy bandwidths adequate to enable enjoyment of even HD content.

Accordingly, in one embodiment, the present disclosure provides a system for allowing the display of subscriber content. The system comprises a server application residing on a platform server, an appliance application residing on a network-enabled viewing appliance, and a mobile device application residing on a mobile device. The server application determines the location of each of the network-enabled viewing appliance and the mobile device. When the server application determines that the network-enabled viewing appliance and the mobile device are within a set distance of each other, the server application allows for the display of subscriber content on the network-enabled viewing appliance. When the server application determines that the network-enabled viewing appliance and the mobile device are not within the set distance of each other, the server application does not allow for the display of subscriber content on the network-enabled viewing appliance.

DETAILED DESCRIPTION OF THE DISCLOSURE

Figure 1:
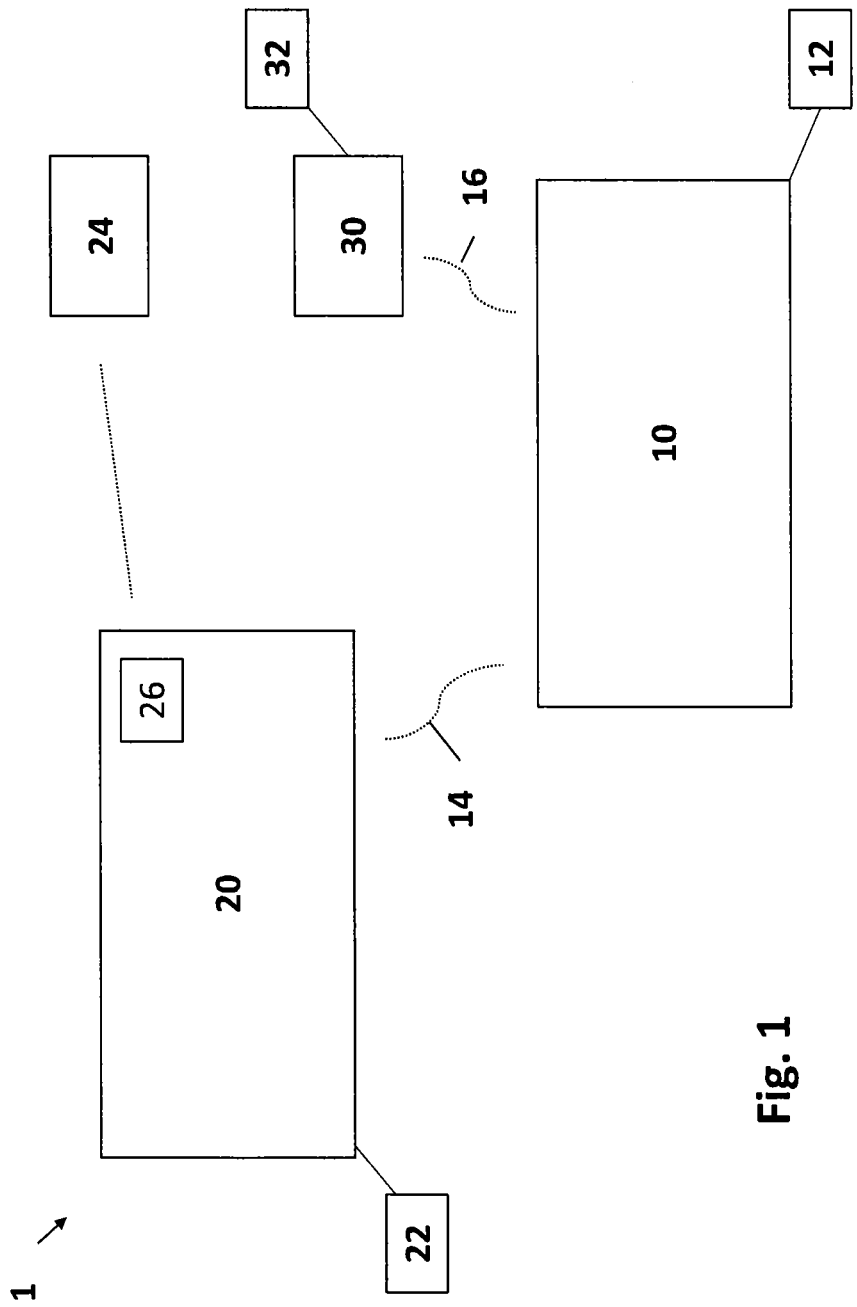
FIG. 1 shows a schematic drawing of the system of the present disclosure.

Referring to FIG. 1, a schematic drawing of the components of the system, generally represented by reference numeral 1, of the present disclosure is shown. Server application 12 resides on a server 10. Server 10 is in communication with Internet appliance 20, which has appliance application 22 residing thereon. Finally, a user has smartphone 30, which has smartphone application 32 residing thereon. Server 10 is in communication with each of Internet appliance 20 and smartphone 30 through public Internet network links 14 and 16, respectively. System 1 of the present disclosure comprises server application 12, appliance application 22, smartphone application 32, and optionally one or more of server 10, Internet appliance 20, and smartphone 30.

To set up system 1 of the present disclosure, a user would activate appliance application 22. This can be done with a remote control 24, selecting a button 26 on a screen of Internet appliance 20, or via manually touching button 26. This activates the temporary authorization protocol for the user to access their subscribed content through the Internet appliance 20. The appliance application 22 would then send to platform server 10 (e.g. iTunes) via the Public Internet, through link 16, a request for a unique code. The code could take the form of an alphanumeric message, an audible sound, or a visual image. Server 10 then sends the code to Internet appliance 20 through link 14. The code would be presented by Internet appliance 20 as appropriate (visually or aurally) either on the TV screen the appliance is attached to, or on its own screen if a Smart TV.

The subscriber would take action to enter the code into the app 32 residing on smartphone 30 as appropriate. For example, the user could manually enter the code on the keyboard of smartphone 30, capture a sound emitted by Internet appliance 20 via speakers of the TV display it is attached to using the microphone built into smartphone 30, or scan a displayed image with camera built into smartphone 30. Smartphone application 32 would receive the code from the appropriate smartphone's system and bundle that information with the identity of the user/subscriber of smartphone 30 (which is embedded in the smartphone for all purposes of identification, such as making phone calls), i.e. the temporary subscriber, and the location of smartphone 30 that has been reported to app 32 by the smartphone's locations services system to server 10 and server application 12 via link 16. The location is provided by the location services function on smartphone 30, via smartphone application 32.

The location of Internet appliance 20 can also be determined via a location services function on internet appliance 20, and communicated via link 14 to server 10 and server application 12. The location can also be determined with other methods, such as the address of the subscriber based on billing, or I.P. (Internet Protocol) address analysis. After determining that the code sent to appliance 20 and received from smartphone 30 match, server application 12 then determines whether smartphone 30 and Internet appliance 20 are within a set distance from one another by comparing the two locations. If smartphone 30 and Internet appliance 20 are within the set distance, server application 12 will allow content to be displayed on appliance 20. If smartphone 30 and Internet appliance 20 are too far away from one another, content cannot be displayed. Server application 12 can also cut off access to subscriber content if the user shuts off smartphone 30.

Server application 12 can also check for a signal from smartphone 30 and whether smartphone 30 and appliance 20 are within the set distance at scheduled intervals. The scheduled intervals can be such that access is not terminated when the user experiences a momentary loss of cell or internet service. For example, server application 12 can inquire (aka ping) to check the location of smartphone 30 and calculate the distance between smartphone 30 and appliance 20 every five minutes, every three minutes, or every one minute. This ensures that access is not terminated by a brief loss of connection, but only when the user shuts off smartphone 30 or travels beyond the set distance from appliance 20 for an extended time. Server application 12 can also send a message to the user through smartphone 30 when communication is interrupted, prompting the user to confirm that they are still within the set distance.

Importantly, the actual distance between smartphone 30 and Internet appliance 20 is not determined by direct communication between the two. Rather, the actual distance is calculated by server application 12, based on independent location reporting from each component (i.e., from each of smartphone 30 and Internet appliance 20). "Location services" is a term of art that describes systems that most, if not all, smartphones include. Essentially the systems that are designed by and placed in smartphones by their manufacturers are intended to report to apps in the smartphone where the smartphone is. For instance, a basic feature of any mapping program would be to show where the smartphone is on a map of the area. In order to accomplish that task, the app queries the location services of the device for the geocode, latitude/longitude, or some other metaphor for location, and then indicates that location on its map display for the user to determine their location with respect to the surroundings.

Location Services typically rely upon wireless cellular towers, which transmit their locations, Wi-Fi transmitters, aka "nodes", which transmit their identifications, and sometimes global positioning system (GPS) location. There are many independent enterprises that map Wi-Fi node identifications and their locations, internationally. This is why when Wi-Fi is turned off on a smartphone, the user is alerted via a message that location accuracy will be reduced. Smartphone manufacturers subscribe to these Wi-Fi node mapper services and so have access to very accurate location information by comparing node location information, cellular tower information and GPS position. Often smartphone location services are accurate to within 5 feet.

The set distance can vary depending on the application or environment in which system 1 is used, but the set distance is not otherwise limited. System 1 will often (though not exclusively) be used in home viewing environments. Thus, the set distance is a value that allows the user to view desired content when smartphone 30 is in the same residence or dwelling as Internet appliance 20, but not when smartphone 30 leaves the residence or dwelling. As one example, in the case of stand-alone houses, the set distance could be from zero to one hundred feet, or any subranges therebetween, or from zero to fifty feet, or any subranges therebetween. In the case of an apartment building, the set distance could be from zero to twenty feet, or any subranges therebetween.

When server application 12 determines that smartphone 30 is within the set distance from Internet appliance 20, the "identity" of Internet appliance 20 would temporarily become that of the user, i.e. temporary subscriber, whose identity is verified by smartphone application 32. During the temporary access period, Internet appliance 20 will take on the visual appearance as though it were customized according to the settings or preferences of the user of smartphone 30. At that point, and subject to business rules promulgated by the platform, Internet appliance 20 would have access to all content, whether sell through, rental, or subscription held in the account of the temporary subscriber. Such content might be delivered from server 10 to Internet appliance 20 using any of the current or future protocols to deliver content, e.g. download, progressive download, enhanced progressive download, streaming, and the like.

Therefore appliance 20, as a result of a successful temporary authentication, will have new information placed into it by server application 12 on server 10, such as lists or icons of individual titles of content that they have previously purchased, placing the temporary subscriber's access codes into the apps that already exist on Internet appliance 20, placing app icons with download cues and then, once downloaded into Internet appliance 20 will also have downloaded into them the temporary subscriber's access codes.

By relying on two independent determinations of location, a far more robust relative proximity of the two devices is achieved. Other systems might try to exploit "proximity" of the smartphone 30 to Internet appliance 20 but this approach is fraught with very easy "spoofing". For example, counterfeiting the Wi-Fi I.D. of smartphone 30 with a device in proximity to Internet appliance 20 would appear to place the subscriber in a location that they were nowhere near, allowing for fraudulent activity. Spoofing the two location services systems in smartphone 30 and simultaneously Internet appliance 20 to report fraudulent locations, while always possible, is significantly more challenging.

There may be rules agreed to between the platform that governs server 10 (e.g. iTunes®, Netflix®) and the copyright licensors that restrict delivery of content. For example, some content may not be available in different countries or broadcast areas. Some copyright owners may not be willing to allow their content to be utilized in the manner of the present disclosure. Some platforms restrict the number of devices which can access content. Accordingly, the user may have access to all, some or no content subscribed to, based on whose residence Internet appliance 20 is located.

There can be a case where an application or "app" is provided by a platform (e.g. Hulu®, Netflix®), which gives a user access to certain categories of content, but where the "apps" are not found on Internet appliance 20 because the resident subscriber has not subscribed to the content offered by those "apps". In this case, server 10 and appliance 12 will show these apps "as available for download". If and when the temporary subscriber downloads these apps onto Internet appliance 20, they will be configured as they are on the temporary subscriber's "apps" on their appliance in their residence. Any apps that are downloaded to Internet appliance 20 during the temporary access period are deleted or removed after the temporary access ends.

Server application 12 will check to see which of the apps that the user of smartphone 30 employs are already on Internet appliance 20 (e.g., Hulu®, Netflix®, etc.). Server application 12 can then either download any missing apps onto Internet appliance 20, or place "ghost" or "cue" icons on appliance 20 asking the user whether they wish to download the apps onto appliance 20. This latter scenario can be useful when the user employs several apps that are not on Internet appliance 20. If the user has, for example, five apps that are not on appliance 20, it would be time-consuming to download all five. Further, it may be unnecessary, since the user may only want to use one of the apps. The user can select which of the apps they want to download onto appliance 20. Server application 12 also downloads the user's sign-in and profile information, so that it does not have to be re-entered.

When the user is done viewing the content, the identity of Internet appliance 20 would revert back to the original subscriber, without further intervention or action by either party. This feature introduces another element of the convenience for subscribers that is designed to induce them to embrace the system described herein. At the end of the access session, or when the user brings smartphone 30 outside the set distance from Internet appliance 20, server application 12 can delete any apps from Internet appliance 20 that were downloaded during the session.

As previously discussed, for further security to avoid fraud, during the temporary access, while the content is being displayed, server application 12 would query smartphone 30 and confirm that its location had not changed in such a way to suggest that the subscriber had left the residence of Internet appliance 20. If server application 12 determines that smartphone 30 has left the vicinity, i.e. moved to a location beyond the set distance away from Internet appliance 20, then server application 12 could revert Internet appliance 20 to its original subscriber. In addition, system 1 can notice and detect when a user allows a different party to use their smartphone 30 to access system 1. For example, in an apartment building, the set distance can be twenty feet, so a user could conceivably be in one apartment unit while allowing another party access to system 1 from an adjacent apartment unit that is still within the set distance. System 1 could detect unusual viewing patterns that are indicative of an unauthorized user, such as relating to time of day and type of content. System 1 could then notify the user about the unauthorized use.

Figure 2:
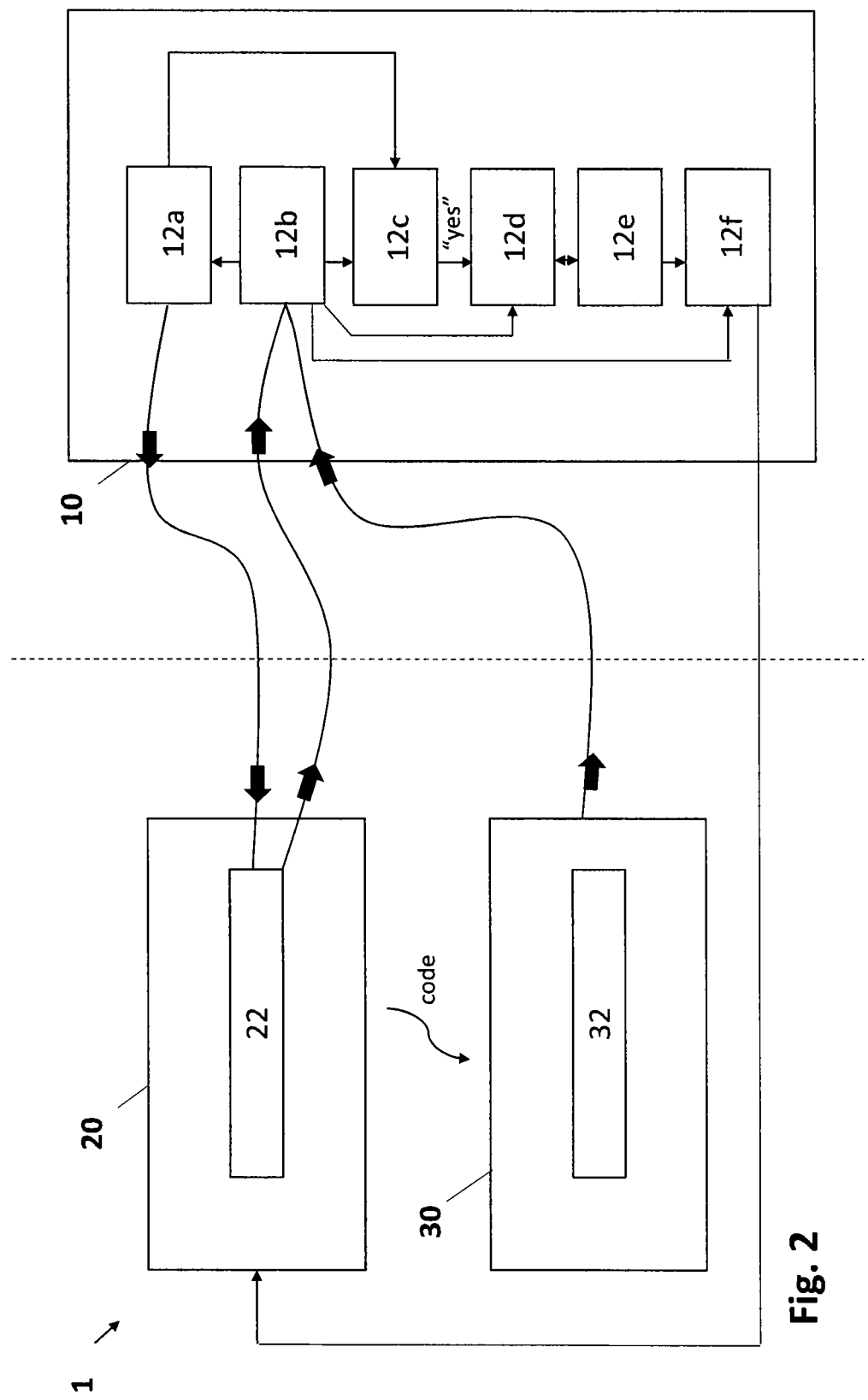
FIG. 2 shows a schematic drawing of how the system of the present disclosure allows a user access to content.

FIG. 2 is a schematic drawing illustrating what happens when the system of the present disclosure allows user access to content. Application 22 of Internet appliance 20 is caused to send a request for a code in one of the ways previously described (e.g., selecting or opening application 22 via a remote control for appliance 20). Application 22 then sends a request for a session code to server 10 running server application or app 12. This step is represented by arrow 12*a* in FIG. 2. The message that application 22 sends to server 10 also includes the location of Internet appliance 20, as well as any other needed identification. In response, app 12 sends the code to application 22, and also sends it to a code comparator 12*c*.

In one of the ways described above, the user enters the code being displayed by application 22 into application 32 of smartphone 30 (e.g., manually entering the code, using the camera or microphone of smartphone 30 to acquire an image or sound emitted by appliance 20). Application or app 32 then sends the code, the location of smartphone 30, and the smartphone and user identification to application 12, as represented by arrow 12b. Application 12 then sends the information received from application 32 to the code comparator 12c.

If the codes match, the comparator 12c sends a message to location comparator 12d, the latter of which compares the location data sent by applications 22 and 32. The location comparator 12d compares the location data to determine the distance between Internet appliance 20 and smartphone 30. If appliance 20 does not send enough data to determine the location, algorithm 12 and location comparator 12d can use the billing address associated with appliance 20.

Heuristic engine 12e determines if the distance between Internet appliance 20 and smartphone 30 are within the set distance, or whether the distance complies with other allowed business rules or restrictions, or other confidential information. If engine 12e approves, it can notify the subscriber database 12f, to fill any username and password registers within Internet appliance 20 with that of the user, i.e. temporary subscriber.

While the present disclosure has been described with reference to one or more particular embodiments, it will be understood by those skilled in the art that various changes can be made and equivalents can be substituted for elements thereof without departing from the scope thereof. In addition, many modifications can be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

What is claimed is:

1. A system for temporarily allowing for subscriber content relating to a temporary subscriber to be accessed by the temporary subscriber on a network-enabled viewing appliance of an original subscriber, comprising:
    a server application residing on a platform server;
    a network-enabled viewing appliance being in a fixed location and having
    an appliance application residing thereon, wherein the network-enabled viewing appliance is configured with content associated with the original subscriber, and wherein the original subscriber is not the temporary subscriber; and
    a mobile device application residing on a mobile device of the temporary subscriber,
    wherein the network-enabled viewing appliance and the mobile device each have location services thereon, the location services comprising a system that relies on wireless cellular towers and Wi-Fi transmitters,
    wherein the network-enabled viewing appliance and the mobile device each communicate, in a bundle, both their identity and location that is determined by the location services separately and directly to the server application, so that two independent determinations of location are relied on for a determination of relative proximity of the two devices, the appliance application of the network-enabled viewing appliance communicates its bundle separately and directly to the server application at a time when a code is also requested, the mobile device application of the mobile device communicates its bundle separately and directly to the server application at a time when the mobile device application, that has obtained the code, sends the code to the server application, wherein the server application determines a distance between the network-enabled viewing appliance and the mobile device by comparing the location of each, and wherein the server application determines whether the distance is within a set, predetermined distance,
    wherein, when the server application determines that the distance is within the set distance, the server application changes the content displayed on the network-enabled viewing appliance so that the network-enabled viewing appliance shows the content associated with the temporary subscriber, and thus the content associated with the original subscriber is no longer available,
    wherein, when the server application determines that the distance is not within the set distance, the server application does not change the content displayed on the network-enabled viewing appliance so that the content displayed on the network-enabled viewing appliance remains the content associated with the original subscriber.

2. The system of claim 1, wherein the server application allows for the display of the content associated with the temporary subscriber on the network-enabled viewing appliance by transmitting data relating to the content associated with the temporary subscriber to the network-enabled viewing appliance, and for storing the data on the network-enabled viewing appliance.

3. The system of claim 1, wherein the set distance is between zero and one hundred feet.

4. The system of claim 1, wherein the set distance is between zero and twenty feet.

5. The system of claim 1, wherein the server application queries the appliance application and the mobile device application periodically to determine whether the network-enabled viewing appliance and the mobile device are within the set distance.

6. The system of claim 5, wherein the server application queries the appliance application and the mobile device application once every five minutes.

7. The system of claim 1, wherein, when the server application changes content displayed on the network-enabled viewing appliance to the content associated with the temporary subscriber, the server application either downloads content viewing applications onto the network-enabled viewing appliance, or places prompts on the network-enabled viewing appliance that would allow for download of the content viewing applications.

8. The system of claim 1, wherein, after the server application changes the content displayed on the network-enabled viewing appliance to the content associated with the temporary subscriber, the content of the network-enabled viewing appliance reverts back to the content associated with the original subscriber without action by the original subscriber or the temporary subscriber.

9. The system of claim 1, wherein the network-enabled viewing appliance and the mobile device that each communicate directly with the server application, do not communicate their location to one another.

10. The system of claim 1, wherein the content associated with the original subscriber comprises settings and a visual appearance associated with the original subscriber and the content associated with the temporary subscriber comprises settings and a visual appearance associated with the temporary subscriber, wherein, when the server application determines that the distance is within the set distance, the server application changes the settings and visual appearance of the network-enabled viewing appliance so that the network-enabled viewing appliance takes on the settings and visual appearance associated with the temporary subscriber and the settings and visual appearance associated with the original subscriber are not available, and wherein, when the server application determines that the distance is not within the set distance, the server application does not change the settings and visual appearance of the network-enabled viewing appliance to the settings and visual appearance associated with the temporary subscriber, so that the settings and visual appearance of the network-enabled viewing appliance remain the settings and visual appearance associated with the original subscriber.

11. A method for temporarily allowing a temporary subscriber to access content relating to the temporary subscriber on a network-enabled viewing appliance of an original subscriber with a system, wherein the system comprises:
 a server application residing on a platform server;
 the network-enabled viewing appliance being in a fixed location having an appliance application residing thereon; and
 a mobile device application residing on a mobile device, the method comprising the steps of:
 determining a location of each of the network-enabled viewing appliance and the mobile device via location services on each, where the network-enabled viewing appliance and the mobile device each communicate their location that is determined by the location services and identity, in a bundle, separate and directly to the server application, wherein the appliance application of the network-enabled viewing appliance communicates its bundle separately and directly to the server application at a time when a code is also requested, the mobile device application of the mobile device communicates its bundle separately and directly to the server application at a time when the mobile device application, that has obtained the code, sends the code to the server application, the location services comprising a system that relies on wireless cellular towers and Wi-Fi transmitters;
 determining whether the network-enabled viewing appliance and the mobile device are within a set distance of each other; and
 wherein, when the server application determines that the network-enabled viewing appliance and the mobile device are within the set distance of each other, changing the content displayed on the network-enabled viewing appliance so that the network-enabled viewing appliance shows the content associated with the temporary subscriber and the content associated with the original subscriber is not available;
 wherein, when the server application determines that the network-enabled viewing appliance and the mobile device are not within the set distance of each other, not changing the content displayed on the network-enabled viewing appliance so that the content displayed on the network-enabled viewing appliance remains the content associated with the original subscriber.

12. The method of claim 11, wherein the changing step comprises transmitting data relating to the content associated with the temporary subscriber to the network-enabled viewing appliance, and storing the data on the network-enabled viewing appliance.

13. The method of claim 11, wherein the set distance is between zero and one hundred feet.

14. The method of claim 11, wherein the set distance is between zero and twenty feet.

15. The method of claim 11, further comprising the step of querying the appliance application and the mobile device application periodically to determine whether the network-enabled viewing appliance and the mobile device are within the set distance.

16. The method of claim 15, wherein the querying step comprises querying the appliance application and the mobile device application once every five minutes.

17. The method of claim 11, further comprising the step of changing the content displayed on the network-enabled viewing appliance back to the content associated with the original subscriber without action by the original subscriber or the temporary subscriber.

18. The method of claim 11, wherein the network-enabled viewing appliance and the mobile device that each communicate directly with the server application, do not communicate their location to one another.

19. The method of claim 11, wherein the content associated with the original subscriber comprises settings and a visual appearance associated with the original subscriber and the content associated with the temporary subscriber comprises settings and a visual appearance associated with the temporary subscriber,
 wherein, when the server application determines that the distance is within the set distance, the server application changes the settings and visual appearance of the network-enabled viewing appliance so that the network-enabled viewing appliance takes on the settings and visual appearance associated with the temporary subscriber and the settings and visual appearance associated with the original subscriber are not available, and
 wherein, when the server application determines that the distance is not within the set distance, the server application does not change the settings and visual appearance of the network-enabled viewing appliance to the settings and visual appearance associated with the temporary subscriber, so that the settings and visual appearance of the network-enabled viewing appliance remain the settings and visual appearance associated with the original subscriber.

20. A method for temporarily changing the displayed content of a network-enabled viewing appliance from content associated with an original subscriber to content associated with a temporary subscriber with a system, wherein the system comprises:
 a server application residing on a platform server;
 an appliance application residing on the network-enabled viewing appliance that is in a fixed location; and
 a mobile device application residing on a mobile device, the method comprising the steps of:
 determining a location of each of the network-enabled viewing appliance and the mobile device via location services on each, wherein the network-enabled viewing appliance and the mobile device each communicate their location that is determined by the location services and identity, in a bundle, separately and directly to the server application, wherein the appliance application of the network-enabled viewing appliance communicates its bundle separately and directly to the server application at a time when a code is also requested, the mobile device application of the mobile device communicates its bundle separately and directly to the server application at a time when the mobile device application, that has obtained the code, sends the code to the server application, the location services comprising a system that relies on wireless cellular towers and Wi-Fi transmitters; and determining whether the network-enabled viewing appliance and the mobile device are within a set distance of each other;

wherein, when the server application determines that the network-enabled viewing appliance and the mobile device are within the set distance of each other, changing the content displayed on the network-enabled viewing appliance to the content associated with the temporary subscriber, so that the content associated with the original subscriber is not available;

wherein, when the server application determines that the network-enabled viewing appliance and the mobile device are not within the set distance of each other, not changing the content displayed on the network-enabled viewing appliance to the content with the temporary subscriber, so that the content displayed on the network-enabled viewing appliance remains the content associated with the original subscriber, wherein the content associated with the temporary subscriber comprises one or more of the following: user settings, user preferences, and user- or system-downloaded applications.

21. The method of claim 20, wherein the network-enabled viewing appliance and the mobile device that each communicate with the server application do not communicate their location to one another.

22. The method of claim 20, wherein the content associated with the original subscriber comprises settings and a visual appearance associated with the original subscriber and the content associated with the temporary subscriber comprises settings and a visual appearance associated with the temporary subscriber, wherein, when the server application determines that the distance is within the set distance, the server application changes the settings and visual appearance of the network-enabled viewing appliance so that the network-enabled viewing appliance takes on the settings and visual appearance associated with the temporary subscriber and the settings and visual appearance associated with the original subscriber are not available, and wherein, when the server application determines that the distance is not within the set distance, the server application does not change the settings and visual appearance of the network-enabled viewing appliance to the settings and visual appearance associated with the temporary subscriber, so that the settings and visual appearance of the network-enabled viewing appliance remain the settings and visual appearance associated with the original subscriber.

\* \* \* \* \*